(12) United States Patent
Takeuchi et al.

(10) Patent No.: US 7,677,740 B2
(45) Date of Patent: Mar. 16, 2010

(54) OPTICAL DIAPHRAGM AND PROJECTOR

(75) Inventors: Kesatoshi Takeuchi, Shiojiri (JP);
Hiroshi Kuriyama, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 810 days.

(21) Appl. No.: 11/504,641

(22) Filed: Aug. 16, 2006

(65) Prior Publication Data

US 2007/0046905 A1 Mar. 1, 2007

(30) Foreign Application Priority Data

Aug. 23, 2005 (JP) ............................. 2005-240899

(51) Int. Cl.
*G03B 21/14* (2006.01)
(52) U.S. Cl. ..................... 353/97; 396/509; 396/510
(58) Field of Classification Search ............... 348/20, 348/26, 261, 476; 396/170, 262, 439, 449, 396/451, 452, 450, 458, 459, 461, 470, 493, 396/497, 505, 510, 535, 538, 541, 564, 565
See application file for complete search history.

(56) References Cited

U.S. PATENT DOCUMENTS

| | | | | |
|---|---|---|---|---|
| 4,416,527 A | * | 11/1983 | Okura | ............ 396/509 |
| 5,821,655 A | * | 10/1998 | Tokushima et al. | ........... 310/90 |
| 6,853,810 B1 | | 2/2005 | Fujinaga | |
| 7,287,864 B2 | * | 10/2007 | Shirasu et al. | ............ 353/97 |
| 2006/0276072 A1 | | 12/2006 | Fukusawa | |

FOREIGN PATENT DOCUMENTS

| | | |
|---|---|---|
| JP | A-58-174927 | 10/1983 |
| JP | A-63-169623 | 7/1988 |
| JP | A-63-220121 | 9/1988 |
| JP | A-01-145640 | 6/1989 |
| JP | A-07-301845 | 11/1995 |
| JP | A 9-189935 | 7/1997 |
| JP | A-11-133480 | 5/1999 |
| JP | A 2001-154235 | 6/2001 |
| JP | A-2001-174910 | 6/2001 |
| JP | A-2004-045594 | 2/2004 |
| JP | A 2004-54232 | 2/2004 |
| JP | A-2006-337947 | 12/2006 |
| WO | WO 03/028084 A1 | 4/2003 |

\* cited by examiner

*Primary Examiner*—Georgia Y Epps
*Assistant Examiner*—Sultan Chowdhury
(74) *Attorney, Agent, or Firm*—Oliff & Berridge, PLC

(57) ABSTRACT

An optical diaphragm for adjusting a light quantity of an incident light beam includes: a plurality of light-shielding vanes attached to a circumferential portion of an aperture of a base plate in a manner rotatable along a plane orthogonal to an optical axis of the light beam. The light-shielding vanes may be rotated to change an aperture area of the aperture of the base plate for transmitting the light beam. The plurality of light-shielding vanes each include a vane plate for intercepting the incident light beam; and a bearing integrally provided to the vane plate, the bearing each allowing a rotary shaft to be inserted therein so as to be supported by the rotary shaft. The vane plate is perpendicularly attached to the bearing. The plurality of light-shielding vanes move parallel to each other in an opening and closing direction thereof without crossing with each other.

17 Claims, 8 Drawing Sheets

OPTICAL DIAPHRAGM AND PROJECTOR

The entire disclosure of Japanese Patent Application No. 2005-240899, filed Aug. 23, 2005, is expressly incorporated by reference herein.

BACKGROUND

1. Technical Field

The present invention relates to an optical diaphragm and a projector.

2. Related Art

There has been employed in a camera a light-shielding device capable of changing an aperture area formed on an optical axis by a plurality of light-shielding vanes that are movable in a plane orthogonal to the optical axis (see, for instance, Document: JP-A-9-189935).

In the light-shielding device disclosed in the Document, the plurality of light-shielding vanes include first vanes that are each made of only a resin material and second vanes that each include at least a portion made of a metal material, the first and second vanes being arranged alternately in an optical axis direction. The second vanes each have a projected portion abutting and sliding on the first vanes or a supporter. With such arrangement, a defect in operational characteristics associated with abutting and sliding of the plurality of vanes can be improved.

However, when the light-shielding device disclosed in the Document is installed in a projector and used as an optical diaphragm for adjusting a light quantity of a light beam irradiated by a light source device, the following problem will arise.

When the light beam irradiated by the light source device is intercepted by the light-shielding vanes, a temperature of the light-shielding vanes is known to rise to 200° C. or higher. However, the first light-shielding vanes are made of a resin material in the light-shielding device disclosed in the Document, so that the first light-shielding vanes cannot cope with such temperature rise caused by the light interception.

Here, in order to solve the problem described above, it is conceived to form the plurality of light-shielding vanes by a metal material that enables the light-shielding vanes to cope with the temperature rise caused by the light-interception. However, such arrangement generates a frictional noise due to abutting and sliding of the plurality of light-shielding vanes, thus being unable to ensure silence of the device.

SUMMARY

An exemplary object of the invention is to provide an optical diaphragm capable of ensuring silence without generating a frictional noise caused by abutting and sliding of a plurality of light-shielding vanes, even when the plurality of light-shielding vanes are made of a metal material, as well as to provide a projector using the optical diaphragm.

An optical diaphragm, according to an aspect of the invention, for adjusting a light quantity of an incident light beam includes: a base plate extending along a plane orthogonal to an optical axis of the light beam, the base plate having an aperture for transmitting the light beam; a plurality of light-shielding vanes attached to a circumferential portion of the aperture of the base plate in a manner rotatable along the plane orthogonal to the optical axis of the light beam, the light-shielding being rotated to change an aperture area of the aperture for transmitting the light beam to adjust the light quantity of the light beam; a vane holder for pressing the plurality of light-shielding vanes to the base plate in a manner that the light-shielding vanes are rotatable; a plurality of rotary shafts fixed between the base plate and the vane holder, the rotary shafts each rotatably supporting each of the plurality of light-shielding vanes; and a vane-driving mechanism movably attached to the base plate and engaged with the plurality of light-shielding vanes, the vane-driving mechanism moving relative to the base plate to rotate the plurality of light-shielding vanes. The plurality of light-shielding vanes each include a vane plate for intercepting the incident light beam; and a bearing integrally provided to the vane plate, the bearing each allowing each of the rotary shafts to be inserted therein so as to be supported by each of the rotary shafts. The vane plate is perpendicularly attached to the bearing. The plurality of light-shielding vanes move in parallel to each other in an opening and closing direction thereof without crossing with each other.

According to the aspect of the invention, the plurality of light-shielding vanes each include the vane plate and the bearing. The vane plate is integrally formed with the bearing so as to be substantially vertical to the bearing. In other words, the vane plate is substantially orthogonal to the rotary shaft that is inserted in the bearing when the optical diaphragm is assembled. The plurality of light-shielding vanes do not cross each other, but move in parallel to each other in an opening and closing direction (i.e., a rotation direction). With such arrangement, the plurality of vane plates can be stably rotated along the plane orthogonal to the optical axis of the light beam. Thus, even when, for instance, the plurality of light-shielding vanes are made of the metal material, a frictional noise is not generated since the vane plates of the light-shielding vanes do not slide and abut on each other, thereby ensuring silence.

An optical diaphragm, according to another aspect of the invention, for adjusting a light quantity of an incident light beam includes: a base plate extending along a plane orthogonal to an optical axis of the light beam, the base plate having an aperture for transmitting the light beam; a plurality of light-shielding vanes respectively attached to a circumferential portion of the aperture of the base plate in a manner rotatable along the plane orthogonal to the optical axis of the light beam, the light-shielding being rotated to change an aperture area of the aperture for transmitting the light beam to adjust the light quantity of the light beam; a vane holder for pressing the plurality of light-shielding vanes to the base plate in a manner that the light-shielding vanes are rotatable; a plurality of rotary shafts fixed between the base plate and the vane holder, the rotary shafts each rotatably supporting each of the plurality of light-shielding vanes; and a vane-driving mechanism movably attached to the base plate and engaged with the plurality of light-shielding vanes, the vane-driving mechanism moving relative to the base plate to rotate the plurality of light-shielding vanes. The plurality of light-shielding vanes each include a vane plate for intercepting the incident light beam; and a bearing integrally attached to the vane plate, the bearing allowing each of the rotary shafts to be inserted therein so as to be supported by each of the rotary shafts. An adjacent pair of the vane plates is attached to the base plate and the vane holder via the rotary shafts such that the adjacent pair of the vane plates is spaced apart from each other by a predetermined distance in the optical direction of the light beam. The bearing is arranged such that, when the optical diaphragm is assembled, a thickness of the bearing in the optical axis direction of the light beam is larger than that of the vane plate, and that an end surface in the optical axis direction of the bearing abuts on at least one of the base plate and the vane holder.

According to the aspect of the invention, the plurality of light-shielding vanes each include the vane plate and the bearing. The vane plate and the bearing are integrally formed. The thickness of the bearing in the optical axis direction of the light beam is larger than that of the vane plate. The end surfaces in the optical axis direction of the bearing abut on at least one of the base plate and the vane holder. With such arrangement, when the plurality of light-shielding vanes rotate, the plurality of bearings rotate relative to the plurality of the rotary shafts. Herein, the end surfaces of the plurality of bearings abut and slide on at least one of the base plate and the vane holder, while the plurality of vane plates can be prevented from abutting and sliding on the base plate and the vane holder, which allows the plurality of vane plates to be stably rotated along the plane orthogonal to the optical axis of the light beam. In addition, with such arrangement, by attaching the plurality of light-shielding vanes to the base plate and the vane holder via the plurality of rotary shafts in such a manner that adjacent vane plates are spaced apart from each other by a predetermined distance in the optical axis direction of the light beam, the adjacent vane plates can be prevented from abutting and sliding on each other. Accordingly, the plurality of the light-shielding vanes can rotate stably along the plane orthogonal to the optical axis of the light beam.

Thus, even when, for instance, the plurality of light-shielding vanes are made of a metal material, the frictional noise is not generated since the vane plates of the light-shielding vanes do not slide and abut on each other, thereby ensuring silence.

In the optical diaphragm according to the aspect of the invention, it is preferable that a plurality of recesses are formed on at least one of the base plate and the vane holder. The recesses each allow the bearing of each of the plurality of light-shielding vanes to fit loosely therein. An abutment surface is formed on a bottom portion of each of the plurality of recesses, the abutment surface abutting on an end surface in the optical axis direction of the bearing. Adjacent recesses of the plurality of recesses are so arranged that the abutment surfaces of the adjacent recesses are formed at positions different from each other in the optical axis direction of the light beam.

According to the aspect of the invention, the adjacent recesses out of the plurality of recesses formed on at least one of the base plate and the vane holder are arranged so that positions of the abutting surfaces on which the end surfaces in the optical axis direction of the bearings abut are different from each other in the optical axis direction of the light beam. Owing to this, in a state where the end surfaces in the optical axis direction of the bearings of the plurality of light-shielding vanes abut on the abutting surfaces, the adjacent vane plates can be spaced apart from each other by a predetermined distance in the optical axis direction of the light beam with a simple structure.

In the optical diaphragm according to the aspect of the invention, it is preferable that an adjacent pair of the light-shielding vanes is so arranged that thicknesses of the bearings of the adjacent pair of the light-shielding vanes are different from each other in the optical axis direction.

According to the aspect of the invention, the bearings of the adjacent light-shielding vanes are arranged so that the thicknesses thereof in the optical axis direction are different from each other. Owing to this, in a state where the end surfaces in the optical axis direction of the bearings of the plurality of light-shielding vanes abut on at least one of the base plate and the vane holder, the adjacent vane plates can be spaced apart from each other by a predetermined distance in the optical axis direction of the light beam with a simple structure.

In the optical diaphragm according to the aspect of the invention, it is preferable that a plurality of biasing members are each provided at least one of a position between each of the plurality of light-shielding vanes and the base plate and a position between each of the plurality of light-shielding vanes and the vane holder. The biasing members each bias each of the plurality of light-shielding vanes so that an end surface in the optical axis direction of the bearing abuts on at least one of the base plate and the vane holder.

According to the aspect of the invention, the optical diaphragm includes the plurality of biasing members. The biasing members respectively bias the plurality of light-shielding vanes so that the end surfaces in the optical axis direction of the bearings can abut on at least one of the vane holder and the base plate. Accordingly, rattling of the bearings relative to the plurality of rotary shafts can be prevented. Therefore, the adjacent vane plates do not abut and slide on each other and the plurality of light-shielding vanes can rotate stably along the plane orthogonal to the optical axis of the light beam.

In the optical diaphragm according to the aspect of the invention, it is preferable that a plurality of projected portions are formed on at least one of the base plate and the vane holder at positions facing the vane plates of the plurality of light-shielding vanes so that the projected portions abut on the vane plates.

According to the aspect of the invention, since the plurality of projected portions are formed on at least one of the base plate and the vane holder. With the arrangement, the projected portions can prevent runout of the vane plates in an out-of-plane direction of the plane orthogonal to the optical axis of the light beam during the rotation of the plurality of light-shielding vanes. Accordingly, the adjacent vane plates can be prevented from abutting and sliding on each other, so that the plurality of light-shielding vanes can rotate more stably along the plane orthogonal to the optical axis of the light beam.

In the optical diaphragm according to the aspect of the invention, it is preferable that the projected portions each extend around each of the rotary shafts of the vane plates on which the projected portions each abut, the projected portions each having an arc shape in plan view.

According to the aspect of the invention, the projected portions have shapes as described above. Hence, the projected portions can respectively prevent the runout of the vane plates in the out-of-plane direction of the plane orthogonal to the optical axis of the light beam more securely during the rotation of the plurality of light-shielding vanes. In addition, abutting areas of the respective vane plates and projected portions are reduced, and therefore the friction therebetween is reduced, thereby allowing the light-shielding vanes to rotate smoothly.

In the optical diaphragm according to the aspect of the invention, it is preferable that a ringed recess is formed on a part of an outer circumferential surface of each of the rotary shafts along a rotation direction of the bearing. The outer circumferential surface abuts and slides on the bearing.

According to the aspect of the invention, since the recess is formed on the rotary shaft, abutting areas of the bearing and the rotary shaft are reduced, and therefore the friction therebetween is reduced, thereby allowing the light-shielding vanes to rotate smoothly.

In the optical diaphragm according to the aspect of the invention, it is preferable that a ringed magnet is fit in a bottom portion of the recess formed on each of the rotary shafts. A ringed space defined by the recess formed on each of the rotary shafts, the magnet and the bearing is filled with a magnetic fluid held by a magnetic force of the magnet.

According to the aspect of the invention, the ringed space defined by the recess, the magnet and the bearing is filled with the magnetic fluid. Since the magnetic fluid can be functioned as a lubricating oil between the rotary shaft and the bearing, the friction between the bearing and the rotary shaft can be reduced, thereby allowing the light-shielding vanes to rotate smoothly.

In addition, since the magnetic fluid can be held by the magnetic force of the magnet, the magnetic fluid can be prevented from leaking outside the ringed space, thereby allowing the light-shielding vanes to rotate smoothly for a long time.

In the optical diaphragm according to the aspect of the invention, it is preferable that the magnet is divided at a plane along an axial direction of the rotary shafts into a pair of magnet members.

Meanwhile, when the magnetic fluid is held by the magnetic force of the magnet, magnetic particles dispersed in the magnetic fluid are attracted to the magnet, where gradient in a density of the magnetic fluid is generated in accordance with a gradient in strength of the magnetic field of the magnet.

In the aspect of the invention, since the magnet is divided by the plane along the axial direction of the rotary shaft into the pair of magnet members, strong magnetic fields are generated near the both ends of the magnet in the axial direction of the rotary shaft. Accordingly, in the ringed space, the magnetic fluid has a higher density near the both ends of the magnet in the axial direction of the rotary shaft, while having a lower density near the central portion of the magnet in the axial direction of the rotary shaft, so that the magnetic fluid is held by the magnetic force of the magnet so as to have a substantially C-shaped cross section. Thus, the bearing abuts on the both ends of the magnetic fluid having the substantially C-shaped cross section, so that rattling of the bearing relative to the rotary shaft can be prevented, thereby allowing the light-shielding vanes to rotate stably and smoothly.

A projector according to still another aspect of the invention includes: a light source device; an optical modulator for modulating a light beam irradiated by the light source in accordance with image information; a projection optical device for projecting the light beam modulated by the optical modulator in an enlarged manner; and the above-described optical diaphragm of the invention. The optical diaphragm is disposed on an optical path of the light beam irradiated from the light source device and traveling to the optical modulator for adjusting a light quantity of the light beam irradiated from the light source device and traveling to the optical modulator.

According to the aspect of the invention, since the projector includes the above-described optical diaphragm, the same effects and advantages as the above-described optical diaphragm can be attained.

The light quantity of the light beam irradiated from the light source device to the optical modulator can be adjusted by the optical diaphragm. Thus, a projection image with high contrast ratio can be realized by controlling the optical diaphragm in accordance with luminance of the image, e.g., by controlling the optical diaphragm to reduce the light quantity for an image that is dark as a whole or to increase the light quantity for an image that is light as a whole.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the attached drawings.

Arrangement of Projector

Figure 1:
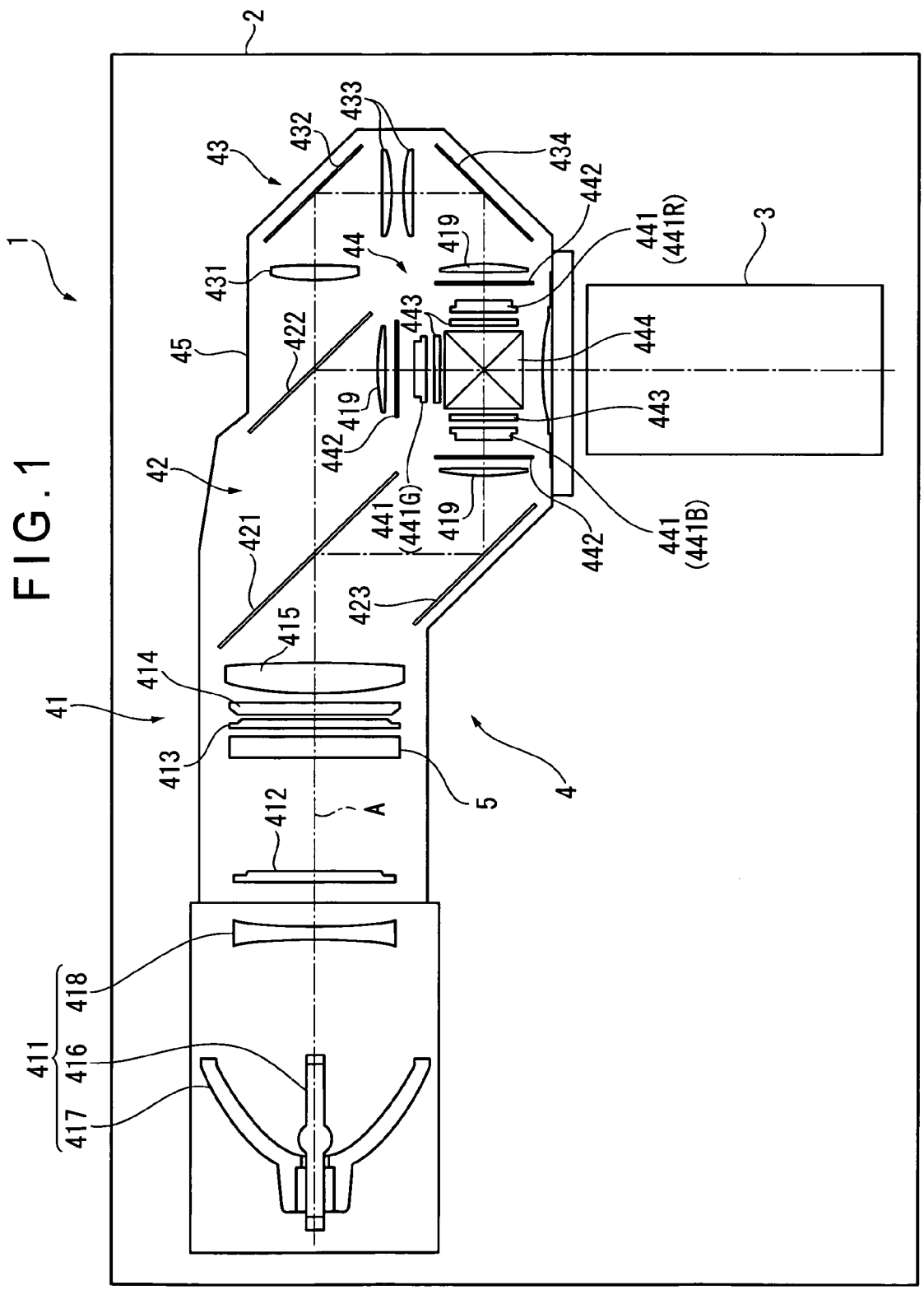
FIG. 1 is an illustration schematically showing an outline of a projector according to a first exemplary embodiment of the invention.

FIG. 1 is an illustration schematically showing an outline of a projector 1.

The projector 1 modulates a light beam irradiated from a light source in accordance with image information to form an optical image and projects the formed optical image on a screen (not shown) in an enlarged manner. As shown in FIG. 1, the projector 1 includes an exterior casing 2, a projection lens 3 as a projection optical device, an optical unit 4 and the like.

Incidentally, although not shown in FIG. 1, a cooling unit including a cooling fan or the like for cooling inside the projector 1, a power source unit for supplying electrical power to each component inside the projector 1, a control board for entirely controlling the projector 1, etc. are arranged in a space not occupied by the projection lens 3 and the optical unit 4 in the exterior casing 2.

The exterior casing 2 is made of a synthetic resin or the like and formed in a substantially rectangular-parallelepiped shape as a whole, in which the projection lens 3 and the optical unit 4 are arranged and accommodated. Although not shown, the exterior casing 2 has an upper case forming a top side, a front side, a rear side and lateral sides of the projector 1 and a lower case forming a bottom side, the front side, the rear side and the lateral sides of the projector 1. The upper case and the lower case are fixed to each other by screws or the like.

Note that the material of the exterior casing 2 is not limited to the synthetic resin and other materials including metals may be used.

The optical unit 4 optically processes the light beam irradiated from the light source to form the optical image (color image) corresponding to the image information under the control of the control board. The optical unit 4 extends along the rear side and along one of the lateral sides of the exterior casing 2, which forms a substantially L-shape in plan view. Incidentally, an arrangement of the optical unit 4 will be described later in detail.

The projection lens 3 projects the optical image (color image) formed by the optical unit 4 on the screen (not shown) in an enlarged manner. The projection lens 3 includes a lens set of a plurality of lenses housed in a cylindrical lens barrel.

Detailed Arrangement of Optical Unit

The optical unit 4 includes, as shown in FIG. 1, an illumination optical device 41, a color-separating optical device 42, a relay optical device 43, an optical device 44, an optical diaphragm 5 and an optical component casing 45 made of a synthetic resin, the optical component casing 45 accommodating the members 41 to 45 and 5 thereinside, while fixing and supporting the projection lens 3 at a predetermined position.

The illumination optical device 41 is an optical system for substantially uniformly illuminating an image formation area of a later-described liquid crystal panel of the optical device 44. As shown in FIG. 1, the illumination optical device 41 includes a light source device 411, a first lens array 412, a second lens array 413, a polarization converter 414 and a superposing lens 415.

As shown in FIG. 1, the light source device 411 includes a light source lamp 416 for irradiating a radial light beam, a reflector 417 for reflecting the radial light beam irradiated by the light source lamp 416 to converge it to a predetermined position, and a parallelizing concave lens 418 for parallelizing the light beam converged by the reflector 417 relative to an illumination optical axis A. As the light source lamp 416, halogen lamps, metal halide lamps and high-pressure mercury lamps are often used. Note that the reflector 417 is herein an ellipsoidal reflector having a rotary ellipsoidal surface but may be a parabolic reflector having a rotary parabolic surface. When employing the parabolic reflector, the reflector 417 is not provided with the parallelizing concave lens 418.

The first lens array 412 includes small lenses arranged in a matrix form, the lenses each having a substantially rectangular shape when viewed in an optical axis direction. The respective small lenses separate the light beam irradiated by the light source device 411 into a plurality of sub-beams.

The second lens array 413 has the substantially same arrangement as the first lens array 412 to include small lenses in a matrix form. Together with the superposing lens 415, the second lens array 413 focuses an image of the small lens of the first lens array 412 onto the image formation area of the later-described liquid crystal panel of the optical device 44.

The polarization converter 414 is disposed between the second lens array 413 and the superposing lens 415 and converts lights from the second lens array 413 into substantially uniform-type polarized lights.

Specifically, the respective sub-beams converted into the substantially uniform-type polarized lights by the polarization converter 414 are substantially superposed on the image formation area of the later-described liquid crystal panel of the optical device 44 by the superposing lens 415. For a projector employing liquid crystal panels for modulating polarized lights, only uniform-type of polarized lights can be utilized, so that approximately half of the lights from the light source device 411 emitting random polarized lights are not used. Accordingly, with the use of the polarization converter 414, the lights irradiated by the light source device 411 are converted into the substantially uniform-type polarized lights to enhance light utilization efficiency of the optical device 44.

As shown in FIG. 1, the color-separating optical device 42 includes a reflection mirror 423 and two dichroic mirrors 421, 422 which separate the plurality of sub-beams irradiated from the illumination optical device 41 into three color lights of red, green and blue.

The relay optical device 43 includes an incident-side lens 431, a relay lens 433 and reflection mirrors 432, 434 and guides the color lights separated by the color-separating optical device 42 to the liquid crystal panel for red lights.

Red and green light components of the light beam irradiated from the illumination optical device 41 are transmitted through the dichroic mirror 421 of the color-separating optical device 42 and a blue light component thereof is reflected by the dichroic mirror 421. The blue light that has been reflected by the dichroic mirror 421 is reflected by the reflection mirror 423 and passes through a field lens 419 to reach the liquid crystal panel for blue lights. The field lens 419 converts the respective sub-beams irradiated from the second lens array 413 into light beams parallel to the central axis (main beam) thereof. The field lenses 419 provided on the light-incident sides of the liquid crystal panels for green and red lights function in the same manner.

The green light out of the red and green lights transmitted through the dichroic mirror 421 is reflected by the dichroic mirror 422 and transmitted through the field lens 419 to reach the liquid crystal panel for green lights. The red light passes through the dichroic mirror 422, the relay optical device 43 and the field lens 419 to reach the liquid crystal panel for red lights. Note that the relay optical device 43 is used for the red light in order to avoid deterioration in the light utilization efficiency due to light dispersion and the like caused by that the optical path of the red light is longer than those of the other color lights. In other words, the relay optical device 43 is used for directly transmitting the sub-beams incident on the incident-side lens 431 to the field lens 419. Note that although the relay optical device 43 is herein arranged to transmit the red light of the three color lights, but may alternatively be arranged such that the blue light is transmitted therethrough, for example.

The optical device 44 includes three liquid crystal panels 441 (liquid crystal panel for red lights 441R, liquid crystal panel for green lights 441G, liquid crystal panel for blue lights 441B) as an optical modulator, three incident-side polarization plates 442, three irradiation-side polarization plates 443 and a cross dichroic prism 444.

As shown in FIG. 1, the three incident-side polarization plates 442 are disposed on the downstream of the respective field lenses 419 on the optical paths. On the incident-side polarization plates 442, the color lights with their polarization directions aligned in a substantially uniform direction by the polarization converter 414 are incident. The incident-side polarization plates 442 only transmit the polarized lights substantially in the direction same as the polarization axis of the light beams aligned by the polarization converter 414 and absorb the other incident light beams. Although not shown in the figures, the incident-side polarization plate 442 has a light-transmissive substrate made of a sapphire glass, a crystal or the like with a polarization film attached on the substrate.

As shown in FIG. 1, the three liquid crystal panels 441 are disposed on the downstream of the respective incident-side polarization plates 442 on the optical paths. Although not shown in the figures, the liquid crystal panel 441 includes a pair of transparent glass substrates with a liquid crystal (electrooptic material) sealed therebetween and controls orientation of the above-described liquid crystal at a predetermined pixel position in accordance with a drive signal output from the control board to modulate the polarization direction of the polarized light beam irradiated from the incident-side polarization plate 422.

As shown in FIG. 1, the three irradiation-side polarization plates 443 are disposed on the downstream of the respective liquid crystal panels 441 on the optical paths. Although not shown in the figures, the irradiation-side polarization plate 443 has substantially the same arrangement as the incident-side polarization plate 442 and has a light-transmissive substrate with a polarization film attached thereon. Note that the polarization film of the irradiation-side polarization plate 443 is arranged such that a transmission axis of the light beam is substantially orthogonal to a transmission axis of the light beam in the incident-side polarization plate 442.

The cross dichroic prism 444 is an optical element for combining the optical images modulated for each color light irradiated by the irradiation-side polarization plate 443 to form a color image, the cross dichroic prism 444 being disposed on the downstream of the irradiation-side polarization plate 443 on the optical path. The cross dichroic prism 444 has a substantially square profile in plan view formed by adhering four right-angle prisms. Dielectric multi-layer films are formed on boundaries adhering the right-angle prisms. The dielectric multi-layer films reflect the color lights irradiated from the liquid crystal panels 441R and 441B and transmitted through the irradiation-side polarization plates 443, and the dielectric multi-layer films transmit the color light irradiated from the liquid crystal panel 441G and transmitted through the irradiation-side polarization plate 443. Thus, the color lights modulated by the liquid crystal panels 441 are combined to form the color image.

As shown in FIG. 1, the optical diaphragm 5 is disposed between the first lens array 412 and the second lens array 413. Under the control of the control board, the optical diaphragm 5 changes an aperture area for transmitting the light beam by rotating a plurality of light-shielding vanes (described later) to adjust light quantity of the light beam irradiated by the light source device 411 and transmitted through the first lens array 412.

Incidentally, an arrangement of the optical diaphragm 5 will be described below in detail.

Arrangement of Optical Diaphragm

Figure 2:
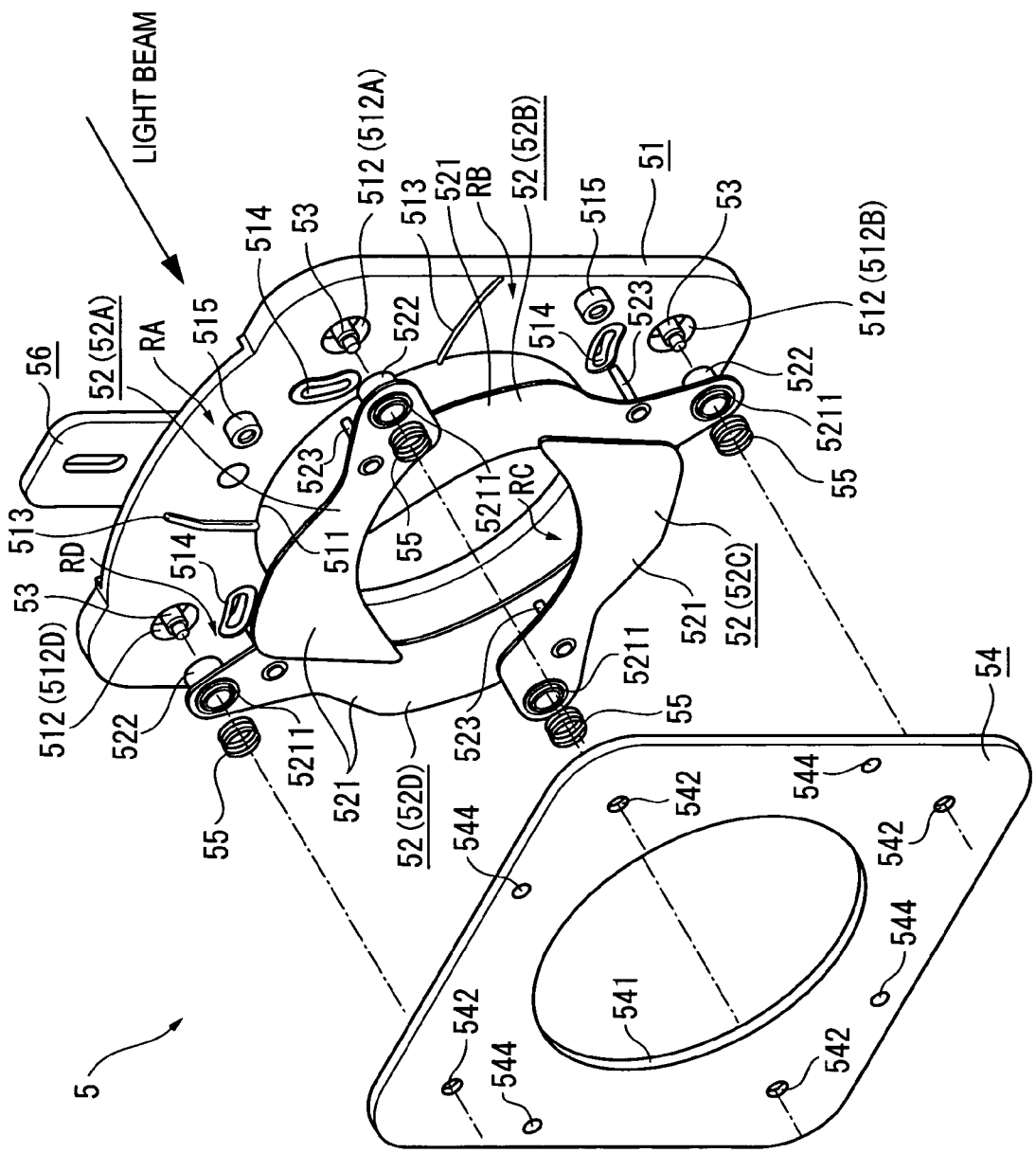
FIG. 2 is an exploded perspective view showing an outline of an optical diaphragm of the first exemplary embodiment.
Figure 3:
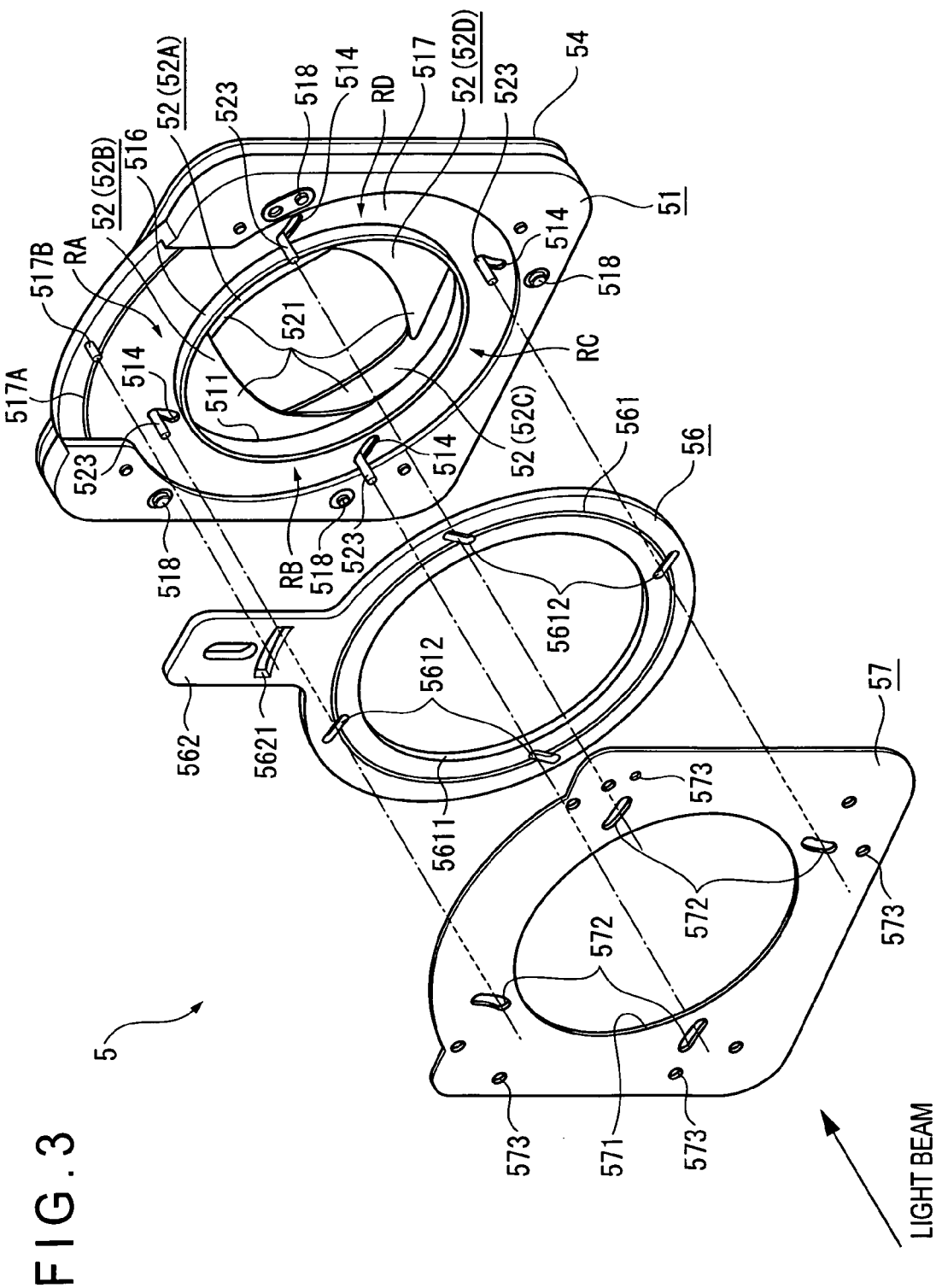
FIG. 3 is another exploded perspective view showing the outline of the optical diaphragm of the first exemplary embodiment.

FIGS. 2 and 3 are exploded perspective views each schematically showing the outline of the optical diaphragm 5. Specifically, FIG. 2 is an exploded perspective view of the optical diaphragm 5 when seen from the light-irradiation side (the second lens array 413 side). FIG. 3 is an exploded perspective view of the optical diaphragm 5 when seen from the light-incident side (the first lens array 412 side).

As shown in FIGS. 2 and 3, the optical diaphragm 5 includes a base plate 51, four light-shielding vanes 52, four rotary shafts 53 (FIG. 2), a vane holder 54, four coil springs 55 as biasing members (FIG. 2), a diaphragm ring 56 as a vane-driving mechanism and a ring holder 57 (FIG. 3). Incidentally, although only three rotary shafts 53 out of the four rotary shafts 53 are shown in FIG. 2, the same rotary shaft 53 is disposed at a lower left corner of the base plate 51, when seen from the light-irradiation side in FIG. 2.

As shown in FIGS. 2 and 3, the base plate 51 is a metal plate having a substantially rectangular shape in plan view and extending along a plane orthogonal to the optical axis of the incident light beam, the base plate 51 fixed in the optical component casing 45 while supporting the entire optical diaphragm 5.

As shown in FIGS. 2 and 3, the base plate 51 has an aperture 511 substantially at the center thereof in plan view, the aperture 511 being circular in plan view and transmitting the light beam irradiated from the first lens array 412.

As shown in FIG. 2, provided in a light-irradiation surface of the base plate 51 are recesses 512 each being circular in plan view. The respective recesses 512 are formed in the vicinity of the four corners of the base plate 51 (512A, 512B, 512C and 512D (see FIGS. 4A and 4B) from the upper right corner in clockwise direction when viewed from the light-irradiation side). Incidentally, although only three rotary recesses 512 out of the four recesses 512 are shown in FIG. 2, the same recess 512 (i.e., 512C in FIG. 4A) is disposed at the lower left corner of the base plate 51, when seen from the light-irradiation side in FIG. 2. These recesses 512 are set to have a uniform depth (see FIGS. 4A and 4B). The recesses 512 fix the four rotary shafts 53 and hold later-described bearings of the four light-shielding vanes 52 in a loosely fitted manner.

Incidentally, a structure of a bottom portion of the recess 512 will be described together with a structure of the light-shielding vane 52.

Hereinbelow, in the base plate 51, a circumferential area around the aperture 511 is divided into following regions for easy understanding as shown in FIGS. 2 and 3: a first region RA including the recess 512A on the upper side; a second region RB including the recess 512B on the right side when seen from the light-irradiation side; a third region RC including the recess 512C (see FIG. 4A) on the bottom side; and a fourth region RD including the recess 512D on the left side when seen from the light-irradiation side.

As shown in FIG. 2, respective projected treads (projected portions) 513 are provided in the regions RA to RD on the light-irradiation surface of the base plate 51. Each projected tread 513 is formed in an arc shape in plan view around each recess 512 (the rotary shaft 53) at a position apart from the recess 512. Incidentally, although only two projected treads 513 in the regions RA, RB out of the four projected treads 513 in the regions RA to RD are shown in FIG. 2, substantially the same projected treads 513 are also formed in the regions RC, RD. The projected treads 513 respectively abut on plate surfaces of later-described vane plates of the light-shielding vanes 52, when the optical diaphragm 5 is assembled.

Although not shown in detail in the figures, the projected treads 513 in the regions RA, RC at diagonal positions of the projected treads 513 are set to have a uniform height. Similarly, the heights of the projected treads 513 in the regions RB, RD at diagonal positions are set to be uniform. The height of the projected treads 513 in the regions RB, RD is set to be larger by a predetermined size than the height of the projected treads 513 in the regions RA and RC.

As shown in FIGS. 2 and 3, respective track holes 514 are provided in the regions RA to RD in the vicinity of the recesses 512 so as to penetrate through the light-irradiation surface and the light-incident surface of the base plate 51. Each track hole 514 is formed in an arc shape in plan view around each recess 512 (the rotary shaft 53). When the optical diaphragm 5 is assembled, later-described pins of the light-shielding vanes 52 are inserted in the track holes 514, so that the track holes 514 serve as relief holes to avoid a mechanical interference of the pins when the pins are moved.

As shown in FIG. 2, attachment portions 515 for attaching the vane holder 54 are provided in the regions RA to RD on the light-irradiation surface of the base plate 51. Incidentally, only two attachment portions 515 in the regions RA, RB out of the four attachment portions 515 in the regions RA to RD are shown in FIG. 2, substantially the same attachment portions 515 are also formed in the regions RC, RD. Each attachment portion 515 is formed at a position not to mechanically interfere with the light-shielding vanes 52 even when the light-shielding vanes 52 are set to the base plate 51 and rotated.

As shown in FIG. 3, a ring supporter 516 having a circular frame shape in plan view is formed at the circumference of the aperture 511 on the light-incidents surface of the base plate 51 so as to project toward the light-incident side. The ring supporter 516 is a portion to be loosely fitted in a later-described circular hole of the diaphragm ring 56.

As shown in FIG. 3, a recess 517 having a circular shape in plan view is provided at a circumferential portion of the ring supporter 516. The upper side of the recess 517 is formed so as to extend to the upper end of the base plate 51. When the diaphragm ring 56 is attached, the recess 517 rotatably supports the diaphragm ring 56 such that the diaphragm ring 56 can rotate substantially around the central axis (the optical axis of the incident light beam) of the aperture 511. The recess 517 has a shape corresponding to the profile of the diaphragm ring 56.

As shown in FIG. 3, a projected tread 517A having an arc shape in plan view is formed substantially around the central axis of the aperture 511 on the upper side of the recess 517. The projected tread 517A abuts on a plate surface of the diaphragm ring 56, when the optical diaphragm 5 is assembled.

A projection pin 517B is formed on the upper side of the projected tread 517A in the recess 517 so as to project toward an out-of-plane direction.

As shown in FIG. 3, a plurality of fitting projections 518 for attaching the ring holder 57 are formed at a circumferential portion of the recess 517 on the light-incident surface of the base plate 51.

Figure 4A:
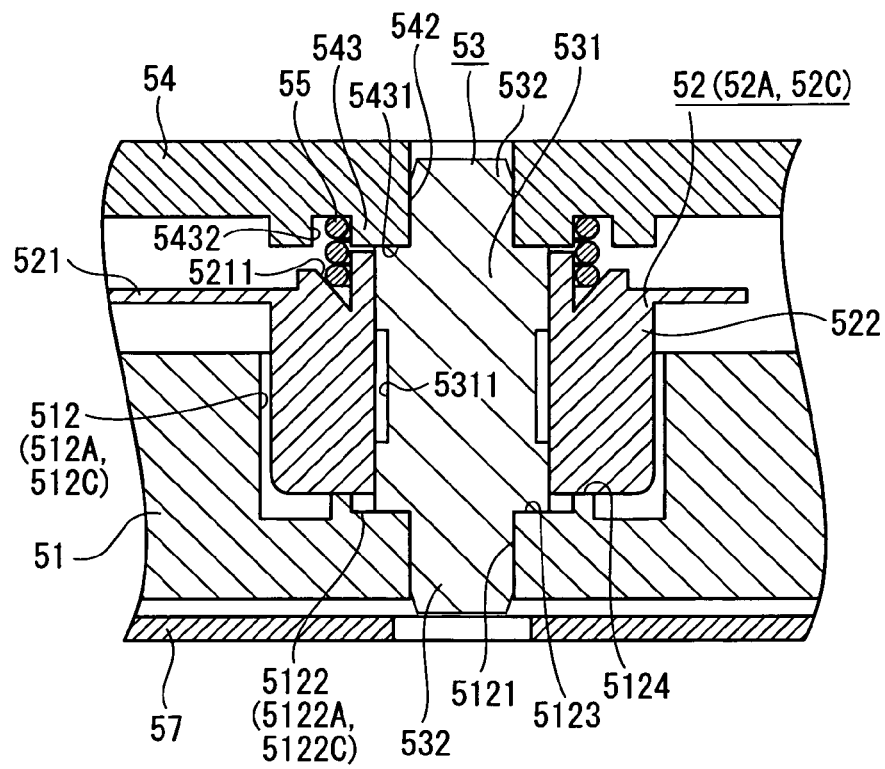
FIGS. 4A and 4B are cross sections each showing a support structure of a light-shielding vane of the first exemplary embodiment.
Figure 4B:
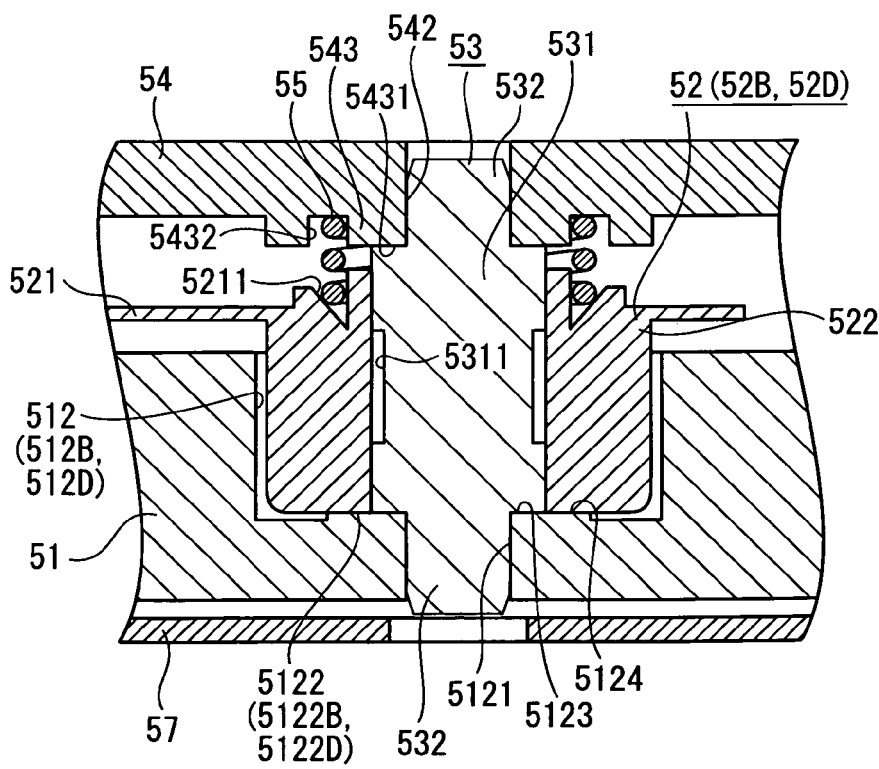

FIGS. 4A and 4B are cross sections each showing a support structure of the light-shielding vane 52. Specifically, FIG. 4A is a cross section showing the support structure of the light-shielding vanes 52 formed in the regions RA, RC. FIG. 4B is a cross section showing the support structure of the light-shielding vanes 52 formed in the regions RB, RD.

The four light-shielding vanes 52 are metal members. As shown in FIG. 2, the light-shielding vanes 52 are respectively supported via the four rotary shafts 53 in the recesses 512 in the regions RA to RD on the light-irradiation surface of the base plate 51, the light-shielding vanes 52 being supported rotatably along a plane orthogonal to the optical axis of the light beam incident on the recesses 512. The light-shielding vanes 52 rotate to change the aperture area for transmitting the light beam, thereby adjusting the light quantity of the light beam irradiated from the first lens array 412. Note that the light-shielding vanes 52 formed in the regions RA to RD are respectively referred to as the light-shielding vanes 52A to 52D in the description below.

The light-shielding vanes 52 have a uniform shape, each of which includes, as shown in FIGS. 2, 3, 4A and 4B, a vane plate 521, a bearing 522 (FIG. 2 and FIGS. 4A and 4B) and a pin 523 (FIGS. 2 and 3).

As shown in FIG. 2, the vane plate 521 has a substantially L-shape in plan view including a curved rim, the vane plate 521 being a metal plate for intercepting the incident light beam. When the optical diaphragm 5 is assembled, an inner portion of the L-shape of the vane plate 521 is oriented toward the center of the aperture 511. The vane plates 521 are disposed so as to cover the aperture 511. When the optical diaphragm 5 is assembled, the vane plates 521 are also provided such that the plate surfaces thereof are orthogonal to the optical axis of the incident light beam.

As shown in FIG. 2 or FIGS. 4A and 4B, spring receiving sections 5211 are formed on the light-irradiation surface of the vane plate 521 at positions corresponding to positions of the bearings 522, the spring receiving sections 5211 each receiving an end of the coil spring 55.

The bearing 522 is integrally formed in an end of the L-shape of the vane plate 521 as a bearing for the rotary shaft 53 that rotates the vane plate 521.

As shown in FIGS. 4A and 4B, the bearing 522 has a substantially cylindrical shape projecting from the light-incident surface toward the light-incident side of the vane plate 521. The rotary shaft 53 can be inserted through the bearing 522. In other words, the thickness of the bearing 522 in the optical axis direction of the light beam is larger than that of the vane plate 521. The bearing 522 is rotatable relative to the rotary shaft 53 with the rotary shaft 53 inserted through the bearing 522. By rotating relative to the rotary shaft 53, the bearing 522 rotates the vane plate 521. Thus, the rotations of the vane plates 521 change the aperture area of the aperture for transmitting the light beam, the aperture being defined by inner edges of the L-shapes of the vane plates 521.

As shown in FIGS. 4A and 4B, when the optical diaphragm 5 is assembled, the rotary shaft 53 is inserted through the bearing 522 and the light-incident surface of the bearing 522 abuts on the bottom portion of the recess 512 of the base plate 51.

The vane plate 521 is arranged to be substantially orthogonal to the bearing 522 and accordingly orthogonal to the rotary shaft 53 inserted through the bearing 522, when the optical diaphragm 5 is assembled. The vane plates 521 are substantially in parallel to the plate surface of the base plate 51, when the optical diaphragm 5 is assembled.

However, the vane plates 521 may not be substantially orthogonal to the respective bearings 522 but may be arranged so as to have any angle other than a right angle relative to the bearings 522 as long as the vane plates 521 do not abut on each other when the light-shielding vanes 52 rotate. Specifically, as long as the vane plates 521 do not abut on each other when the light-shielding vanes 52 rotate, the vane plate 521 may be slant by a predetermined angle relative to a plane parallel to the plate surface of the base plate 51.

Now, as mentioned earlier, the structure of the bottom portion of the recess 512 will be described.

A shaft-fixing hole 5121 is formed on the bottom portion of the recess 512 as shown in FIGS. 4A and 4B, the shaft-fixing hole 5121 fixing an end of the rotary shaft 53 in a fitted manner.

As shown in FIGS. 4A and 4B, formed on the circumference of the shaft-fixing hole 5121 is an abutment portion 5122 having a circular frame shape in plan view and including an abutment surface 5123 and an abutment surface 5124. When the optical diaphragm 5 is assembled, a wide portion of the rotary shaft 53 abuts on the abutment surface 5123, and the light-incident surface of the bearing 522 of the light-shielding vane 52 abuts on the abutment surface 5124. The abutment portions 5122 formed on the recesses 512A to 512D are respectively referred to as the abutment portions 5122A to 5122D.

Specifically, as shown in FIG. 4A, the respective abutment portions 5122A, 5122C formed on the recesses 512A, 512C at diagonal positions out of the recesses 512A to 512D have a uniform shape. As shown in FIG. 4A, the abutment portions 5122A, 5122C each are formed in steps so that the abutment surface 5124 is positioned to be higher from the bottom portion of the recess 512 as compared to the abutment surface 5123.

As shown in FIG. 4B, the respective abutment portions 5122B, 5122D formed on the recesses 512B, 512D at diagonal positions have a uniform shape. As shown in FIG. 4B, the abutment portions 5122B, 5122D each are formed so that the abutment surfaces 5123, 5124 are substantially flush. Here, the respective abutment surfaces 5123 of the abutment portions 5122A, 5122C and the respective abutment surfaces 5123, 5124 of the abutment portions 5122B, 5122D are set to have a uniform height from the bottom portions of the recesses 512. In other words, the respective abutment surfaces 5124 of the abutment portions 5122A, 5122C are set to have a larger height from the bottom portions of the recesses 512 by a predetermined size as compared to the respective abutment surfaces 5124 of the abutment portions 5122B, 5122D.

In the respective recesses 512A to 512D, the abutment surfaces 5124 are set to have different heights as described above. Accordingly, as shown in FIGS. 4A and 4B, when the optical diaphragm 5 is assembled, namely when the respective light-incident surfaces of the bearings 522 of the light-shielding vanes 52 abut on the abutment surfaces 5124, heights of the vane plates 521 from the base plate 51 in the light-shielding vanes 52A to 52D are different.

Specifically, the height of the abutment surfaces 5124 of the abutment portions 5122A, 5122C is set to have larger height from the bottom portions of the recesses 512 as compared to the abutment surfaces 5124 of the abutment portions 5122B, 5122D by the predetermined size. Accordingly, the vane plates 521 of the light-shielding vanes 52A, 52C set in the recesses 512A, 512C are positioned to be higher from the base plate 51 as compared to the vane plates 521 of the light-shielding vanes 52B, 52D set in the recesses 512B, 512D.

Concretely, the vane plates 521 of the light-shielding vanes 52 which are diagonal are positioned to have a uniform height from the base plate 51, and accordingly the vane plates 521 of the adjacent light-shielding vanes 52 have different heights from each other from the base plate 51. This arrangement defines a gap of a predetermined size between the adjacent vane plates 521, thereby preventing mechanical interference between the vane plates 521 when the vane plates 521 are rotated.

The pin 523 is provided in the vicinity of the bearing 522 and on the other side of the vane plate 521 relative to the bearing 522. The pin 523 engages with the diaphragm ring 56 to receive a pressure from the diaphragm ring 56.

As shown in FIG. 2, the pin 523 projects from the light-incident surface of the vane plate 521 toward the light-incident side. As shown in FIG. 2 or 3, when the optical diaphragm 5 is assembled, the pin 523 is inserted in and through the track hole 514 of the base plate 51 to project out from the light-incident surface of the base plate 51 to fit into a later-described elongated hole of the diaphragm ring 56.

The four rotary shafts 53 are metal members. The rotary shaft 53 is fixed between the base plate 51 and the vane holder 54 and supports the light-shielding vane 52 in a rotatable manner. The rotary shafts 53 have a uniform shape. As shown in FIGS. 4A and 4B, each rotary shaft 53 has a substantially cylindrical shape as a whole with a wide portion 531 at a central portion thereof and narrow portions 532 at both ends thereof, the rotary shaft 53 formed to have steps with cross sectional areas at the both ends being smaller than that of the central portion. When the optical diaphragm 5 is assembled, in each of the four rotary shafts 53, the narrow portions 532 are fitted and fixed in the shaft-fixing hole 5121 of the base plate 51 and a later-described shaft-fixing hole of the vane holder 54, while the wide portion 531 abuts on the abutment surface 5123 of the base plate 51 and a later-described abutment surface of the vane holder 54.

As shown in FIGS. 4A and 4B, a ringed recess 5311 is formed substantially at the center in a cylindrical axis direction of the rotary shaft 53, the ringed recess 5311 being around the cylindrical axis.

As shown in FIG. 2, the vane holder 54 is a synthetic resin plate having the substantially same profile as the base plate 51, i.e., having a substantially rectangular shape in plan view. The vane holder 54 presses the light-shielding vanes 52 to the base plate 51 in a rotatable manner.

As shown in FIG. 2, the vane holder 54 has an aperture 541 same as the aperture 511 of the base plate 51. The aperture 541 is substantially at the center of the vane holder 54 in plan view and has a circular shape in plan view. The aperture 541 transmits the light beam irradiated from the first lens array 412.

As shown in FIGS. 2, 4A and 4B, the vane holder 54 has shaft-fixing holes 542 formed at positions corresponding to the recesses 512 of the base plate 51. The shaft-fixing holes 542 penetrate the light-irradiation surface and the light-incident surface of the vane holder 54 and fit in the other end of the rotary shaft 53 (narrow portion 532) to fix the other end of the rotary shaft 53.

As shown in FIGS. 4A and 4B, formed on the circumference of the shaft-fixing hole 542 on the light-incident surface of the vane holder 54 is an abutment portion 543 having an abutment surface 5431 on which the wide portion 531 of the rotary shaft 53 abuts. The abutment portion 543 has a substantially circular frame shape.

As shown in FIGS. 4A and 4B, a spring receiving section 5432 for receiving the other end of the coil spring 55 is formed on the abutment portion 543 at a position facing the spring receiving section 5211 of the bearing 522 of the light-shielding vane 52 when the optical diaphragm 5 is assembled.

As shown in FIG. 2, the vane holder 54 has fixing holes 544 formed at positions corresponding to the attachment portions 515 of the base plate 51. The fixing holes 544 penetrate the light-irradiation surface and the light-incident surface of the vane holder 54 so as to allow fixing screws (not shown) to be inserted. By inserting and screwing the fixing screws (not shown) via the fixing holes 544 into the attachment portions 515, the vane holder 54 is fixed to the base plate 51 while pressing the light-shielding vanes 52 to the base plate 51.

As shown in FIGS. 2, 4A and 4B, the four coil springs 55 are disposed between the light-shielding vanes 52 and the vane holder 54. One end of the coil spring 55 abuts on the spring receiving section 5211 of the light-shielding vane 52, while the other end of the coil spring 55 abuts on the spring receiving section 5432 of the vane holder 54. When the vane holder 54 is attached to the base plate 51, the coil springs 55 respectively bias the light-shielding vanes 52 toward the base plate 51 such that the bearings 522 of the light-shielding vanes 52 abut on the abutment surfaces 5124 of the base plate 51.

The diaphragm ring 56 is rotatably set in the recess 517 of the base plate 51. In this state, the diaphragm ring 56 engages with the pins 523 of the light-shielding vanes 52 and rotates to press the pins 523, thereby rotating the vane plates 521 of the light-shielding vanes 52 around the rotary shafts 53. The diaphragm ring 56 is made of a synthetic resin. As shown in FIG. 3, a ring body 561 and a ring operation section 562 integrally form the diaphragm ring 56.

The ring body 561 is a plate body having a circular frame shape in plan view, the ring body 561 having a circular hole 5611 for allowing the ring supporter 516 of the base plate 51 to be inserted.

As shown in FIG. 3, elongated holes 5612 are formed in the ring body 561 at positions corresponding to the respective track holes 514 of the base plate 51 so as to allow the pins 523 projecting from the track holes 514 to penetrate, the elongated holes 5612 extending substantially linearly in a direction intersecting the circumferential direction substantially around the central axis of the aperture 5111.

The ring operation section 562 extends outward from the outer circumference of the ring body 561 along the plate surface of the ring body 561. When the optical diaphragm 5 is assembled, the ring operation section 562 projects upward from the upper end of the base plate 51. When, for instance, the control board controls a driving section (not shown) such as an actuator or the like to move the ring operation section 562 in a horizontal direction, the ring operation section 562 rotates the ring body 561 substantially around the central axis of the aperture 511.

As shown in FIG. 3, formed on the base end side of the ring operation section 562 is a rotation guiding hole 5621 that penetrates through the light-irradiation surface and the light-incident surface. The rotation guiding hole 5621 allows the projection pin 517B of the base plate 51 to be inserted with the diaphragm ring 56 set in the base plate 51. As shown in FIG. 3, the rotation guiding hole 5621 has an arc shape in plan view substantially around the central axis of the circular hole 5611. The rotation guiding hole 5621 guides a motion of the ring operation section 562, i.e., rotation of the ring body 561, when the ring operation section 562 is operated with the projection pin 517B inserted in the rotation guiding hole 5621.

Since the elongated holes 5612 of the ring body 561 is formed so as to extend substantially linearly in a direction intersecting the circumferential direction substantially around the central axis of the aperture 511, when the optical diaphragm 5 is assembled and the ring operation section 562 is operated to rotate the ring body 561, the pins 523 of the light-shielding vanes 52 are pressed by edges of the elongated holes 5612 such that the pins 523 are moved along the elongated holes 5612. When being moved along the elongated holes 5612, the pins 523 move in a manner rotating around the respective recesses 512 (the rotary shafts 53) of the base plate 51 without mechanically interfering with the track holes 514 of the base plate 51. In accordance with the movement of the pins 523, the vane plates 521 of the light-shielding vanes 52 rotate around the respective rotary shafts 53.

As shown in FIG. 3, the ring holder 57 is a metal plate having a substantially rectangular shape in plan view, the shape being substantially the same as that of the base plate 51. The ring holder 57 rotatably presses the diaphragm ring 56 to the base plate 51.

As shown in FIG. 3, the ring holder 57 has an aperture 571 that is the same as the aperture 511 of the base plate 51. The aperture 571 having a substantially circular shape in plan view is substantially at the center of the ring holder 57 in plan view and transmits the light beam irradiated from the first lens array 412.

As shown in FIG. 3, the ring holder 57 has track holes 572 that are the same as the track holes 514 of the base plate 51, the track holes 572 being at positions corresponding to the track holes 514. Similarly to the track holes 514, when the optical diaphragm 5 is assembled, the pins 523 of the light-shielding vanes 52 are inserted in the track holes 572, so that the track holes 572 serve as relief holes to avoid a mechanical interference with the pins 523 when the pins 523 are moved.

As shown in FIG. 3, the ring holder 57 has a plurality of fitting holes 573 penetrating the light-irradiation surface and the light-incident surface thereof, the fitting holes 573 being at positions corresponding to the plurality of fitting projections 518 of the base plate 51. The fitting hole 517 allows the fitting projection 518 to be inserted therein. When the optical diaphragm 5 is assembled, the fitting projections 518 fit in the fitting holes 573, whereby the ring holder 57 is fixed to the base plate 51 while pressing the diaphragm ring 56 to the base plate 51.

As described above, in the exemplary embodiment, the four light-shielding vanes 52 of the optical diaphragm 5 each include the vane plate 521 and the bearing 522. The thickness of the bearing 522 in the optical axis direction of the light beam is larger than that of the vane plate 521. When the optical diaphragm 5 is assembled, the light-incident surface of the bearing 522 abuts on the abutment surface 5124 of the recess 512. With such arrangement, when the four light-shielding vanes 52 rotate, the respective bearings 522 rotate relative to the four rotary shafts 53. Herein, since the light-incident surfaces of the bearings 522 abut and slide on the abutment surfaces 5124 of the base plate 51, the vane plates 521 can be prevented from abutting and sliding on the base plate 51 and the vane holder 54, which allows the vane plates 521 to be stably rotated along the plane orthogonal to the optical axis of the light beam. In addition, with such arrangement, by attaching the four light-shielding vanes 52 to the base plate 51 and the vane holder 54 via the rotary shafts 53 in such a manner that adjacent vane plates 521 (i.e., the vane plates 521 in the regions RA, RC and the vane plates 521 in the regions RB, RD) are spaced apart from each other by a predetermined distance in the optical axis direction of the light beam, the adjacent vane plates 521 can be prevented from abutting and sliding on each other. Accordingly, the four the light-shielding vanes 52 can rotate stably along the plane orthogonal to the optical axis of the light beam.

Thus, even when the four light-shielding vanes 52 are made of a meal material, the frictional noise is not generated because the vane plates 521 do not abut and slide on each other, thereby ensuring silence.

The adjacent recesses 512 (i.e., the recesses 512A, 512C and the recesses 512B, 512D) out of the recesses 512 formed on the base plate 51 are so formed that positions of the abutment surfaces 5124 abutting on the light-incident surfaces of the bearings 522 are different in the optical axis direction of the light beam. Owing to this, in a state where the light-incident surfaces in the optical axis direction of the bearings 522 of the four light-shielding vanes 52 abut on the abutting surfaces 5124, the adjacent vane plates 521 can be spaced apart from each other by a predetermined distance in the optical axis direction of the light beam with a simple structure.

Since the optical diaphragm 5 includes the four coil springs 55, the coil springs 55 can respectively bias the light-shielding vanes 52 so that the light-incident surfaces of the bearings 522 respectively abut on the abutment surfaces 5124 of the base plate 51. Accordingly, rattling of the bearings 522 relative to the rotary shafts 53 can be prevented. Therefore, the adjacent vane plates 521 do not abut and slide on each other, so that the light-shielding vanes 52 can rotate more stably along the plane orthogonal to the optical axis of the light beam.

Since the four projected treads 513 are formed on the base plate 51, the projected treads 513 each can prevent runout of the vane plate 521 in the out-of-plane direction of the plane orthogonal to the optical axis of the light beam. Accordingly, the vane plates 521 can be rotated more stably along the plane orthogonal to the optical axis of the light beam in such a manner that the adjacent vane plates 521 do not abut and slide on each other, i.e., in such a manner that the adjacent vane plates 522 do not cross each other but are kept substantially in parallel to each other.

Here, the projected tread 513 is formed to have a substantially arc shape in plan view extending around the rotary shaft 53 corresponding to the vane plate 521 on which the projected tread 513 abuts. With the arrangement, the projected tread 513 securely prevents the runout of the vane plate 521 in the out-of-plane direction of the plane orthogonal to the optical axis of the light beam, when the light-shielding vane 52 rotates, while reducing abutting areas between the vane plate 521 and the projected tread 513 to reduce the frictional noise, thereby allowing the light-shielding vane 52 to rotate smoothly.

The rotary shaft 53 has the ringed recess 5311 substantially at the center in the cylindrical axis direction of the wide portion 531, the recess 5311 being around the cylindrical axis. Accordingly, the abutting areas between the bearing receiving section 522 and the rotary shaft 53 can be reduced to reduce the frictional noise, thereby allowing the light-shielding vane 52 to rotate smoothly.

The vane plate 521 is arranged so that its plate surface is orthogonal to the optical axis of the incident light beam when the optical diaphragm 5 is assembled. The arrangement can prevent diffused reflection when the vane plate 521 intercepts the light, and therefore prevents a stray light from being generated in the projector 1.

In addition, since the diaphragm ring 56 is made by a synthetic resin, the diaphragm ring 56 shuts a heat transfer path between the actuator or the like (not shown) attached to the diaphragm ring 56 and the light-shielding vane 52, thereby preventing a trouble which might be caused by a heat from the actuator or the like.

Also, since the diaphragm ring 56 and the vane holder 54 are each made of a synthetic resin, the optical diaphragm 5 can be reduced in weight.

The light quantity of the light beam irradiated from the light source device 411 to the liquid crystal panels 441 can be adjusted by the optical diaphragm 5. Thus, a projection image with high contrast ratio can be realized by controlling the optical diaphragm 5 by the control board in accordance with luminance of the image, e.g., by controlling the optical diaphragm 5 to reduce the light quantity for an image that is dark as a whole or to increase the light quantity for an image that is that is light as a whole.

Second Exemplary Embodiment

Next, a second exemplary embodiment of the invention will be described below with reference to the attached drawings.

In the description below, the same reference numerals will be attached to the structures and components which are same as the first exemplary embodiment to omit or simplify the detailed description thereof.

Figure 5:
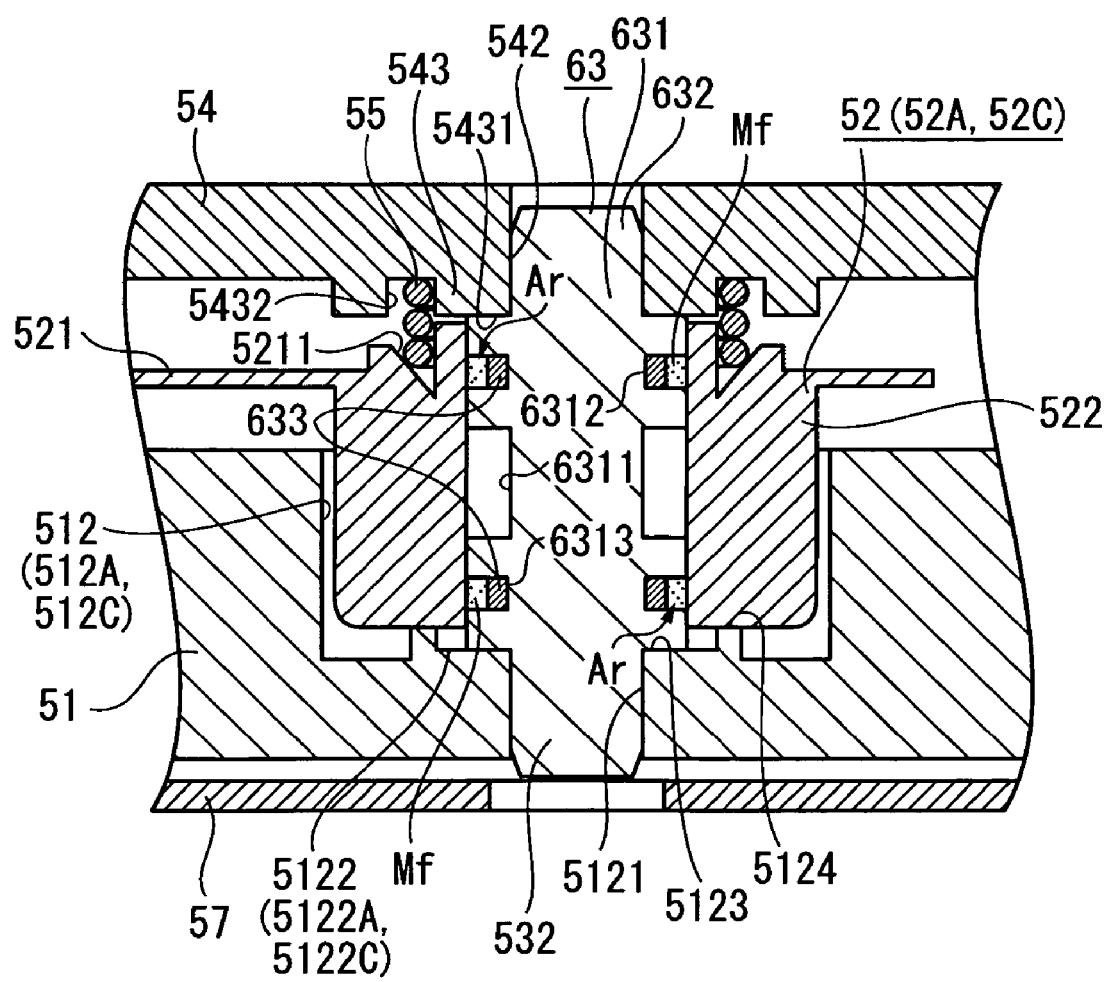
FIG. 5 is an illustration showing a structure of a rotary shaft according to a second exemplary embodiment.

FIG. 5 is an illustration showing a structure of a rotary shaft 63 of the second exemplary embodiment. Note that FIG. 5 shows the rotary shafts 63 disposed in the regions RA, RC out of the regions RA to RD. Here, the rotary shafts 63 disposed in the regions RB, RD are the same as the rotary shafts 63 in the regions RA, RC.

The second exemplary embodiment is only different from the first exemplary embodiment in the structure of the rotary shaft 53 of the optical diaphragm 5. Other arrangements of the optical diaphragm 5 and the arrangement of the projector 1 are the same as those in the first exemplary embodiment.

As shown in FIG. 5, the rotary shaft 63 in the second exemplary embodiment includes a wide portion 631 and narrow portions 632 which are substantially the same as the wide portion 531 and the narrow portions 532 of the rotary shaft 53 described in the first exemplary embodiment.

As shown in FIG. 5, the wide portion 631 has ringed recesses 6311, 6312, 6313 being around a cylindrical axis, the ringed recesses 6311, 6312, 6313 arranged in parallel to each other in a cylindrical axis direction.

As shown in FIG. 5, ringed magnets 633 respectively fit in bottom portions of the recesses 6312, 6313.

As shown in FIG. 5, a ringed space Ar defined by the magnet 633, the recess 6312 and the bearing 522 is filled with a magnetic fluid Mf. Similarly, as shown in FIG. 5, a ringed space Ar defined by the magnet 633, the recess 6313 and the bearing 522 is also filled with the magnetic fluid Mf. The magnetic fluid Mf is held by the magnetic force of the magnet 633 in the space Ar. The magnetic fluid Mf may be any magnetic fluid as long as it has a saturation magnetization value that allows the magnetic fluid to be held by the magnet. For instance, P-series magnetic fluids and magnetic fluids for speakers (manufactured by Ferrotec Corporation) can be used as the magnetic fluid Mf.

Figure 6A:
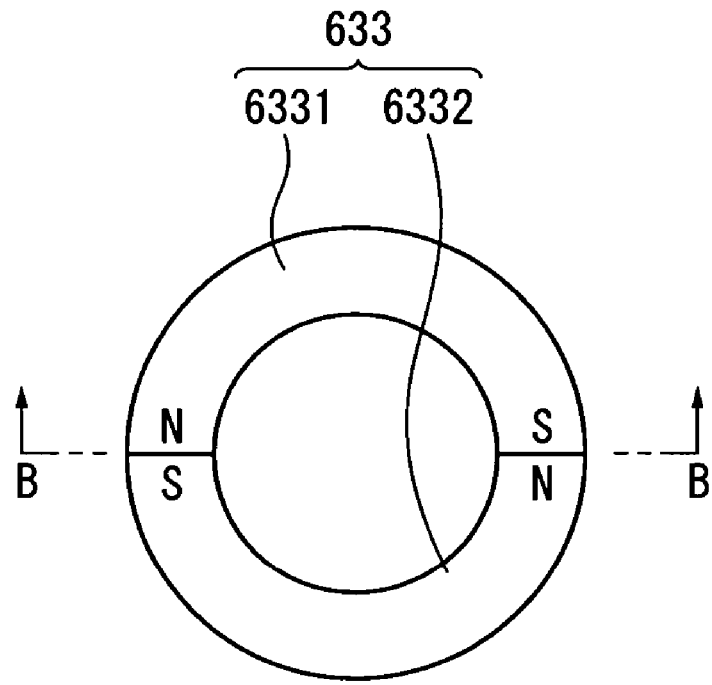
FIG. 6A is an illustration schematically showing an outline of a magnet of the second exemplary embodiment.
Figure 6B:
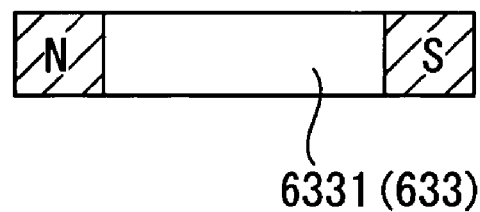
FIG. 6B is a cross section taken along line B-B in FIG. 6A.

FIGS. 6A and 6B each schematically show an outline of the magnet 633. Specifically, FIG. 6A is a plan view of the magnet 633 seen from the cylindrical axis direction the rotary shaft 63. FIG. 6B is a cross section taken along line B-B in FIG. 6A.

The magnet 633 is a permanent magnet made of, for instance, Nd (neodymium). As shown in FIGS. 6A and 6B, the magnet 633 is divided at a plane along the cylindrical axis direction of the rotary shaft 63 into a pair of magnet members 6331, 6332. As shown in FIGS. 6A and 6B, the pair of magnet members 6331, 6332 each have an arc shape in plan view, and the ends of the arc shape are defined as the north pole and the south pole. As shown in FIGS. 6A and 6B, in the magnet 633, different poles at the respective ends of the pair of magnet members 6331 and 6332 are attracted to each other, where the pair of magnet members 6331, 6332 are integrated by the magnetic force.

Figure 7:
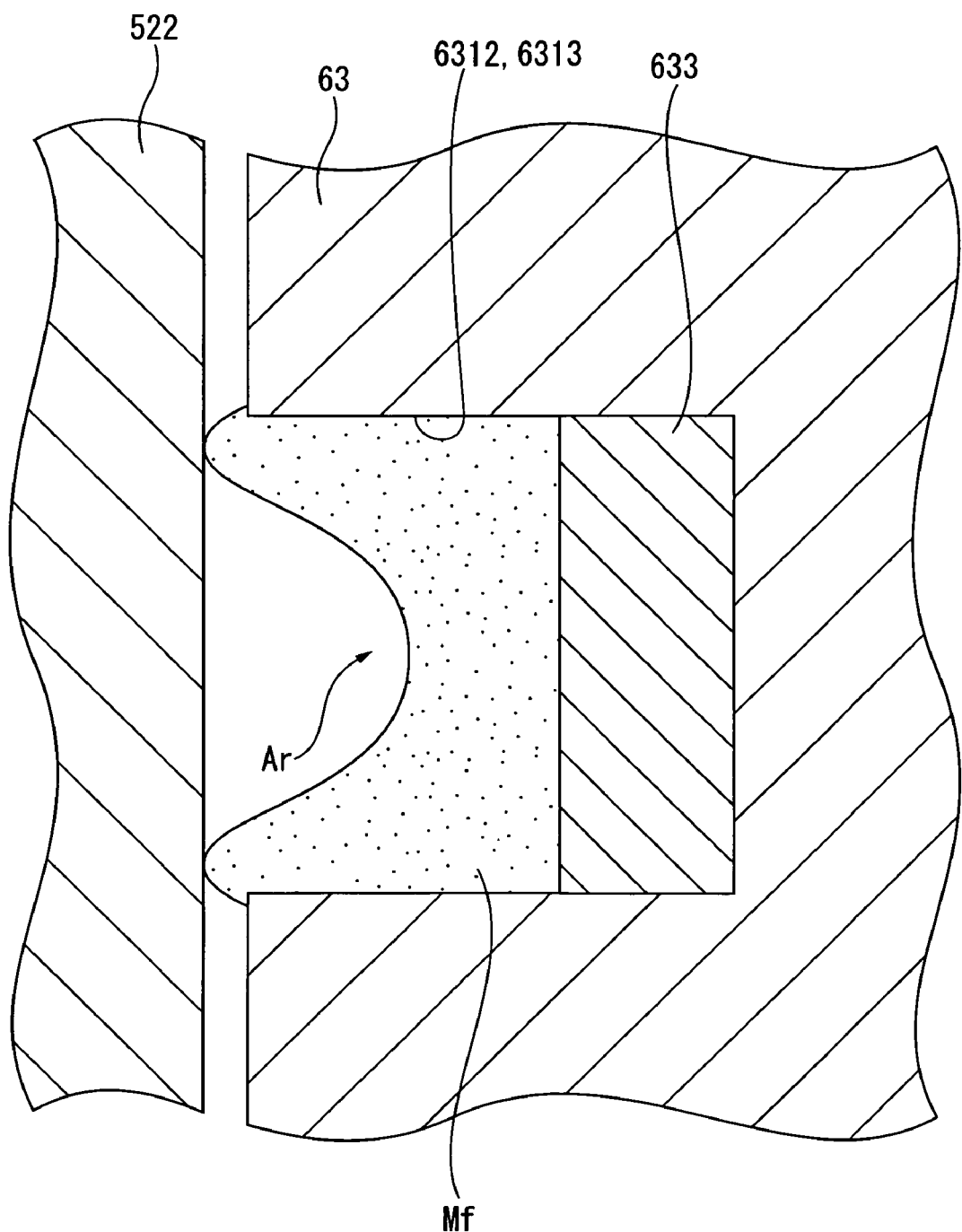
FIG. 7 is an illustration schematically showing how a magnetic fluid is held in a space by the magnet of the second exemplary embodiment.

FIG. 7 is an illustration schematically showing how the magnetic fluid Mf is held by the magnet 633 in the space Ar.

Meanwhile, when the magnetic fluid Mf is held by the magnetic force of the magnet 633, magnetic particles dispersed in the magnetic fluid Mf are attracted to the magnet 633, where gradient in density of the magnetic fluid Mf is generated in accordance with gradient in strength of a magnetic field of the magnet 633.

As described above, the magnet 633 is divided at the plane along the cylindrical direction of the rotary shaft 63 into the pair of magnet members 6331, 6332. Accordingly, the magnetic field is strong near both ends of the magnet 633 in the cylindrical axis direction of the rotary shaft 63, while the magnetic field is weak near a central portion of the magnet 633 in the cylindrical axis direction of the rotary shaft 63. Thus, as shown in FIG. 7, the density of the magnetic fluid Mf in the space Ar is high at a portion with a strong magnetic field and low at a portion with a weak magnetic field in accordance with the gradient in the strength of the magnetic field of the magnet 633. The magnetic fluid Mf is held by the magnet 633 so as to have a substantially C-shaped cross section. Therefore, as shown in FIG. 7, each projected portion on both ends of the substantially C-shape cross section of the magnetic fluid Mf abuts on the bearing 552.

In the second exemplary embodiment, unlike the first exemplary embodiment, since the ringed spaces Ar defined by the recesses 6312, 6313, the magnet 633 and the bearing 522 are each filled with the magnetic fluid Mf, the magnetic fluid Mf can serve as a lubricating oil between the rotary shaft 63 and the bearing 522, thereby allowing the light-shielding vane 52 to rotate smoothly.

In addition, since the magnetic fluid Mf can be held by the magnetic force of the magnet 633, the magnetic fluid Mf can be prevented from leaking from the ringed space Ar, thereby allowing the light-shielding vane 52 to rotate smoothly for a long time.

Since the magnet 633 is divided along the plane in the cylindrical axis direction of the rotary shaft 63 into the pair of magnet members 6331, 6332, the magnet fluid Mf can be held by the magnetic force of the magnet 633 so as to have the substantially C-shaped cross section in the space Ar. Thus, the bearing 522 abuts on each projected portion on the both ends of the substantially C-shaped cross section of the magnetic fluid Mf, so that rattling of the bearing 522 relative to the rotary shaft 63 can be prevented, thereby allowing the light-shielding vane 52 to rotate stably and smoothly.

Note that the scope of the invention is not restricted to the above-described exemplary embodiments, but includes modifications and improvements as long as the object of the invention can be achieved.

In the exemplary embodiments, the adjacent recesses 512 (i.e., the recesses 512A, 512C and the recesses 512B, 512D) out of the recesses 512 formed on the base plate 51 are so formed that the positions of the abutment surfaces 5124 in the optical axis direction of the light beam are different from each other. With such arrangement, the vane plates 521 of the adjacent light-shielding vanes 52 (i.e., the light-shielding vanes 52A, 52C and the light-shielding vanes 52B, 52D) out of the four light-shielding vanes 52 are spaced apart from each other by a predetermined distance in the optical axis direction of the light beam. However, without limiting to the arrangement, any arrangement may be employed to arrange the adjacent vane plates 521 so as to be spaced apart from each other by a predetermined distance in the optical axis direction of the light beam.

Figure 8A:
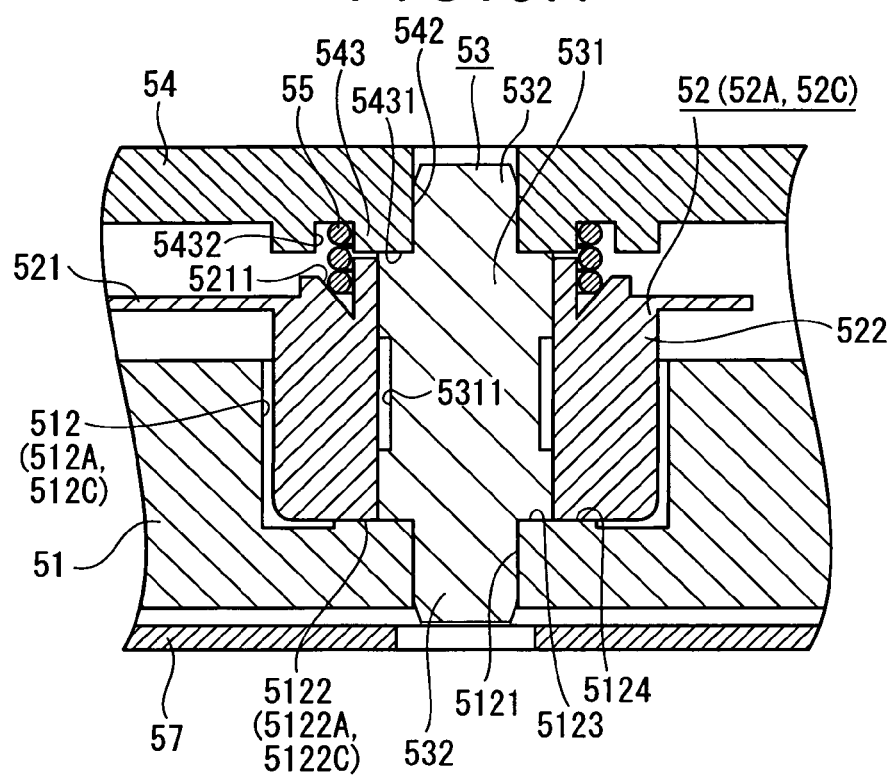
FIGS. 8A an 8B are illustrations each showing a modification of the first exemplary embodiment.
Figure 8B:
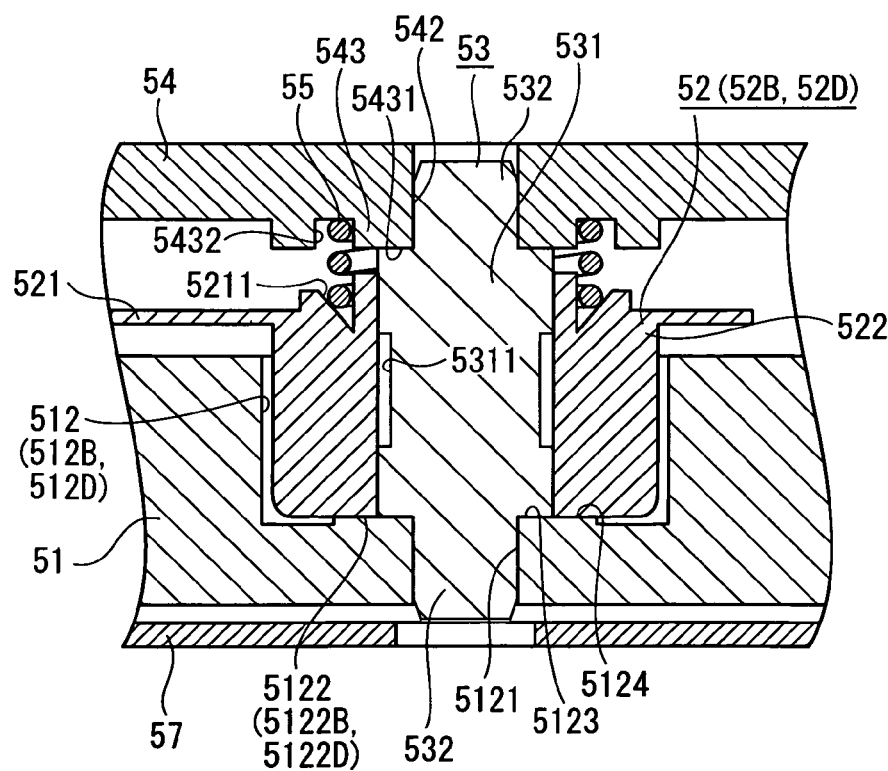

FIGS. 8A and 8B each show a modification of the first exemplary embodiment. Specifically, FIG. 8A is a cross section showing the support structure of the light-shielding vanes 52 formed in the regions RA, RC. FIG. 8B is a cross section showing the support structure of the light-shielding vanes 52 formed in the regions RB, RD.

As shown in FIGS. 8A and 8B, the abutment surfaces 5124 of the recesses 512 (512A to 512D) formed on the base plate 51 are positioned at a uniform position in the optical axis direction of the light beam. Also, the bearings 522 of the adjacent light-shielding vanes 52 out of the four light-shielding vanes 52 are set to have a uniform thickness in the optical axis direction of the light beam. Specifically, as shown in FIG. 8A, the bearings 522 of the light-shielding vanes 52A, 52C are set to have a uniform thickness in the optical axis direction. Similarly, as shown in FIG. 8B, the bearings 522 of the light-shielding vanes 52B, 52D are set to have a uniform thickness in the optical axis direction. Then, as shown in FIGS. 8A and 8B, the bearings 522 of the light-shielding vanes 52A, 52C are set to have a larger thickness in the optical axis direction as compared to the bearings 522 of the light-shielding vanes 52B, 52D. With such arrangement, by allowing respective end surfaces in the optical direction (the light-incident surfaces) of the bearings 522 of the four light-shielding vanes 52 to abut on the abutment surfaces 5124 of the base plate 51, the adjacent vane plates 521 (i.e., the vane plates 521 of the light-shielding vanes 52A, 52C and the vane plates 521 of the light-shielding vanes 52B, 52D) can be spaced apart from each other in the optical axis direction of the light beam.

Incidentally, although a modification of the first exemplary embodiment is shown in FIGS. 8A and 8B, the above-described modification may be applied to the second exemplary embodiment.

In the exemplary embodiments above, although the light-shielding vane 52 is so arranged that the light-incident surface of the bearing 522 abuts on the abutment surface 5124 of the recess 512 formed on the base plate 51, the arrangement is not limited thereto. A recess and an abutment surface may be formed on the vane holder 54 so that the light-incident surface of the bearing 522 abuts on the abutment surface.

Although there are four light-shielding vanes 52 in the exemplary embodiments above, there may be two, three, or five or more.

In the exemplary embodiments described above, the projected tread 513 is formed on the base plate 51, but a similar projected tread may be formed on the vane holder 54.

In the exemplary embodiments above, the vane plates 521 of the light-shielding vanes 52A, 52C are positioned at a uniform position in the optical axis direction of the light beam. Similarly, the vane plates 521 of the light-shielding vanes 52B, 52D are positioned at a uniform position in the optical axis direction of the light beam. The vane plates 521 of the light-shielding vanes 52A, 52C and the vane plates 521 of the light-shielding vanes 52B, 52D are positioned at positions different from each other in the optical axis direction of the light beam. However, without limiting to the arrangement above, the vane plates 521 of the light-shielding vanes 52A to 52D may be positioned at positions different from each other in the optical axis direction of the light beam.

Although the diaphragm ring 56 is made of a synthetic resin in the exemplary embodiments above, the material is not limited thereto. Any material may be used for the diaphragm ring 56 as long as the material has low thermal conductivity. The same is applied to the material of the vane holder 54.

In the exemplary embodiments above, the optical diaphragm 5 is disposed between the first lens array 412 and the second lens array 413, but the arrangement is not limited thereto. The optical diaphragm 5 may be disposed at any position as long as the optical diaphragm 5 is on the optical path of the light beam that is irradiated by the light source device 411 and travels to the liquid crystal panels 441.

In the exemplary embodiments above, the projector 1 has the three liquid crystal panels 441, but the arrangement is not limited thereto. The invention may be applied to a projector including only one liquid crystal panel or two or four or more liquid crystal panels.

In the exemplary embodiments above, the optical unit 4 has the substantially L-shape in plan view. However, the optical unit 4 may employ other shapes such as a substantially U-shape in plan view.

In the exemplary embodiments above, the transmissive optical modulator having different light-incident side and light-irradiation side is employed. However, a reflective optical modulator having the same light-incident side and irradiation side may also be employed.

Although the optical modulator is the liquid crystal panel in the exemplary embodiments above, the optical modulator may be other devices such as a device using a micromirror. In such case, the incident-side polarization plate 442 and the irradiation-side polarization plate 443 may be omitted.

Although the optical diaphragm 5 is installed in the projector 1 in the exemplary embodiments above, the optical diaphragm 5 may be installed in other optical equipment such as a camera without limiting to the projector 1. When the optical diaphragm 5 is installed in the camera, the optical diaphragm 5 may be used not only as a diaphragm but also as a lens shutter or the like.

Although the best mode and the like for implementing the invention have been disclosed above, the invention is not limited thereto. In other words, while the invention has been mainly illustrated and described on the specific exemplary embodiments, a person skilled in the art can modify the arrangements such as shape, material, quantity and the like of the above-described exemplary embodiments without departing from the technical idea and scope of the invention.

Therefore, the description limiting the shapes, materials and the like disclosed above is intended to be illustrative for easier understanding but not to limit the invention, hence the invention includes a description using a name of the components without a part of or all of the limitation on the shapes, materials and the like.

The optical diaphragm of the invention is capable of ensuring silence without generating frictional noise caused by abutting and sliding of a plurality of light-shielding vanes, even when the plurality of light-shielding vanes are made of a metal material. Therefore, the optical diaphragm is useful when applied to a projector used for a presentation or a home theater.

What is claimed is:

1. An optical diaphragm for adjusting a light quantity of an incident light beam, comprising:
   a base plate extending along a plane orthogonal to an optical axis of the light beam, the base plate having an aperture for transmitting the light beam;
   a plurality of light-shielding vanes attached to a circumferential portion of the aperture of the base plate in a manner rotatable along the plane orthogonal to the optical axis of the light beam, the light-shielding vanes being rotated to change an aperture area of the aperture for transmitting the light beam to adjust the light quantity of the light beam;
   a vane holder for pressing the plurality of light-shielding vanes to the base plate in a manner that the light-shielding vanes are rotatable;
   a plurality of rotary shafts fixed between the base plate and the vane holder, the rotary shafts each rotatably supporting each of the plurality of light-shielding vanes; and
   a vane-driving mechanism movably attached to the base plate and engaged with the plurality of light-shielding vanes, the vane-driving mechanism moving relative to the base plate to rotate the plurality of light-shielding vanes, wherein
   the plurality of light-shielding vanes each include a vane plate for intercepting the incident light beam; and a bearing integrally provided to the vane plate, the bearing each allowing each of the rotary shafts to be inserted therein so as to be supported by each of the rotary shafts,
   the vane plate is perpendicularly attached to the bearing,
   the plurality of light-shielding vanes move in parallel to each other in an opening and closing direction thereof without crossing with each other, and
   an adjacent pair of the light-shielding vanes are so arranged that thicknesses of the bearings of the adjacent pair of the light-shielding vanes are different from each other in the optical axis direction.

2. An optical diaphragm for adjusting a light quantity of an incident light beam, comprising:
   a base plate extending along a plane orthogonal to an optical axis of the light beam, the base plate having an aperture for transmitting the light beam;
   a plurality of light-shielding vanes respectively attached to a circumferential portion of the aperture of the base plate in a manner rotatable along the plane orthogonal to the optical axis of the light beam, the light-shielding vanes being rotated to change an aperture area of the aperture for transmitting the light beam to adjust the light quantity of the light beam;
   a vane holder for pressing the plurality of light-shielding vanes to the base plate in a manner that the light-shielding vanes are rotatable;
   a plurality of rotary shafts fixed between the base plate and the vane holder, the rotary shafts each rotatably supporting each of the plurality of light-shielding vanes; and
   a vane-driving mechanism movably attached to the base plate and engaged with the plurality of light-shielding vanes, the vane-driving mechanism moving relative to the base plate to rotate the plurality of light-shielding vanes, wherein
   the plurality of light-shielding vanes each include a vane plate for intercepting the incident light beam; and a bearing integrally attached to the vane plate, the bearing allowing each of the rotary shafts to be inserted therein so as to be supported by each of the rotary shafts,
   an adjacent pair of the vane plates is attached to the base plate and the vane holder via the rotary shafts such that the adjacent pair of the vane plates is spaced apart from each other by a predetermined distance in the optical axis direction of the light beam,
   the bearing is arranged such that, when the optical diaphragm is assembled, a thickness of the bearing in the optical axis direction of the light beam is larger than that of the vane plate, and that an end surface in the optical axis direction of the bearing abuts on at least one of the base plate and the vane holder, and
   an adjacent pair of the light-shielding vanes are so arranged that thicknesses of the bearings of the adjacent pair of the light-shielding vanes are different from each other in the optical axis direction.

3. The optical diaphragm according to claim 1, wherein
   a plurality of recesses are formed on at least one of the base plate and the vane holder, the recesses each allowing the bearing of each of the plurality of light-shielding vanes to fit loosely therein,
   an abutment surface is formed on a bottom portion of each of the plurality of recesses, the abutment surface abutting on an end surface in the optical axis direction of the bearing, and
   adjacent recesses of the plurality of recesses are so arranged that the abutment surfaces of the adjacent recesses are formed at positions different from each other in the optical axis direction of the light beam.

4. The optical diaphragm according to claim 2, wherein
   a plurality of recesses are formed on at least one of the base plate and the vane holder, the recesses each allowing the bearing of each of the plurality of light-shielding vanes to fit loosely therein,
   an abutment surface is formed on a bottom portion of each of the plurality of recesses, the abutment surface abutting on an end surface in the optical axis direction of the bearing
   adjacent recesses of the plurality of recesses are so arranged that the abutment surfaces of the adjacent recesses are formed at positions different from each other in the optical axis direction of the light beam.

5. The optical diaphragm according to claim 1, wherein a plurality of biasing members are each provided at least one of a position between each of the plurality of light-shielding vanes and the base plate and a position between each of the plurality of light-shielding vanes and the vane holder, the biasing members each biasing each of the plurality of light-shielding vanes so that an end surface in the optical axis direction of the bearing abuts on at least one of the base plate and the vane holder.

6. The optical diaphragm according to claim 2, wherein a plurality of biasing members are each provided at least one of a position between each of the plurality of light-shielding vanes and the base plate and a position between each of the plurality of light-shielding vanes and the vane holder, the biasing members each biasing each of the plurality of light-shielding vanes so that the end surface in the optical axis direction of the bearing abuts on at least one of the base plate and the vane holder.

7. The optical diaphragm according to claim 1, wherein a plurality of projected portions are formed on at least one of the base plate and the vane holder at positions facing the vane plates of the plurality of light-shielding vanes so that the projected portions abut on the vane plates.

8. The optical diaphragm according to claim 2, wherein a plurality of projected portions are formed on at least one of the base plate and the vane holder at positions facing the vane plates of the plurality of light-shielding vanes so that the projected portions abut on the vane plates.

9. The optical diaphragm according to claim 7, wherein the projected portions each extend around each of the rotary shafts of the vane plates on which the projected portions each abut, the projected portions each having an arc shape in plan view.

10. The optical diaphragm according to claim 8, wherein the projected portions each extend around each of the rotary shafts of the vane plates on which the projected portions each abut, the projected portions each having an arc shape in plan view.

11. The optical diaphragm according to claim 1, wherein a ringed recess is formed on a part of an outer circumferential surface of each of the rotary shafts along a rotation direction of the bearing, the outer circumferential surface abutting and sliding on the bearing.

12. The optical diaphragm according to claim 2, wherein a ringed recess is formed on a part of an outer circumferential surface of each of the rotary shafts along a rotation direction of the bearing, the outer circumferential surface abutting and sliding on the bearing.

13. The optical diaphragm according to claim 11, wherein
a ringed magnet is fit in a bottom portion of the recess formed on each of the rotary shafts, and
a ringed space defined by the recess formed on each of the rotary shafts, the magnet and the bearing is filled with a magnetic fluid held by a magnetic force of the magnet.

14. The optical diaphragm according to claim 12, wherein
a ringed magnet is fit in a bottom portion of the recess formed on each of the rotary shafts, and
a ringed space defined by the recess formed on each of the rotary shafts, the magnet and the bearing is filled with a magnetic fluid held by a magnetic force of the magnet.

15. The optical diaphragm according to claim 13, wherein the magnet is divided at a plane along an axial direction of the rotary shafts into a pair of magnet members.

16. The optical diaphragm according to claim 14, wherein the magnet is divided at a plane along an axial direction of the rotary shafts into a pair of magnet members.

17. A projector, comprising:
a light source device;
an optical modulator for modulating a light beam irradiated by the light source in accordance with image information;
a projection optical device for projecting the light beam modulated by the optical modulator in an enlarged manner;
and an optical diaphragm for adjusting a light quantity of an incident light beam, wherein
the optical diaphragm is disposed on an optical path of the light beam irradiated from the light source device and traveling to the optical modulator for adjusting a light quantity of the light beam irradiated from the light source device and traveling to the optical modulator, the optical diaphragm including:
a base plate extending along a plane orthogonal to an optical axis of the light beam, the base plate having an aperture for transmitting the light beam; a plurality of light-shielding vanes respectively attached to a circumferential portion of the aperture of the base plate in a manner rotatable along the plane orthogonal to the optical axis of the light beam, the light-shielding vanes being rotated to change an aperture area of the aperture for transmitting the light beam to adjust the light quantity of the light beam; a vane holder for pressing the plurality of light-shielding vanes to the base plate in a manner that the light-shielding vanes are rotatable; a plurality of rotary shafts fixed between the base plate and the vane holder, the rotary shafts each rotatably supporting each of the plurality of light-shielding vanes; and a vane-driving mechanism movably attached to the base plate and engaged with the plurality of light-shielding vanes, the vane-driving mechanism moving relative to the base plate to rotate the plurality of light-shielding vanes,
the plurality of light-shielding vanes each include a vane plate for intercepting the incident light beam; and a bearing integrally provided to the vane plate, the bearing each allowing each of the rotary shafts to be inserted therein so as to be supported by each of the rotary shafts,
the vane plate is perpendicularly attached to the bearing,
the plurality of light-shielding vanes move in parallel to each other in an opening and closing direction thereof without crossing with each other, and
an adjacent pair of the light-shielding vanes are so arranged that thicknesses of the bearings of the adjacent pair of the light-shielding vanes are different from each other in the optical axis direction.

* * * * *